(12) United States Patent
Lequesne et al.

(10) Patent No.: US 7,234,361 B2
(45) Date of Patent: Jun. 26, 2007

(54) MAGNETOSTRICTIVE STRAIN SENSOR (AIRGAP CONTROL)

(75) Inventors: Bruno P. B. Lequesne, Troy, MI (US); Thaddeus Schroeder, Rochester Hills, MI (US); Donald T. Morelli, White Lake, MI (US); Thomas A. Baudendistel, Farmersville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/034,440

(22) Filed: Jan. 11, 2005

(65) Prior Publication Data

US 2006/0150743 A1    Jul. 13, 2006

(51) Int. Cl.
*G01B 7/16* (2006.01)
*G01B 5/30* (2006.01)
(52) U.S. Cl. ........................................................ 73/779
(58) Field of Classification Search .................. 73/779
See application file for complete search history.

(56) References Cited

U.S. PATENT DOCUMENTS 6,622,577 B1* 9/2003 Uras ........................ 73/862.69
2004/0107777 A1* 6/2004 Lequesne et al. .............. 73/779

* cited by examiner

*Primary Examiner*—Max Noori
(74) *Attorney, Agent, or Firm*—Scott A. McBaln

(57) ABSTRACT

A sensor assembly for measuring force along an axis (F) comprises an inductance coil extending around the axis (F) for establishing a loop of magnetic flux looping axially through the coil and extending around the axis (F) to define a donut shaped ring of magnetic flux surrounding the axis (F). A core of magnetostrictive material provides a primary path for the magnetic flux in a first portion of the loop of magnetic flux and a magnetic carrier provides a return path for magnetic flux in a second portion of the loop of magnetic flux as the magnetic flux circles the coil through the core and the carrier. A first interface extends radially between the core and the carrier whereby the core and the carrier are urged together at the interface in response to a force applied parallel to the axis (F). Various embodiments or combinations of the core and carrier are illustrated in FIGS. 3–7.

15 Claims, 4 Drawing Sheets

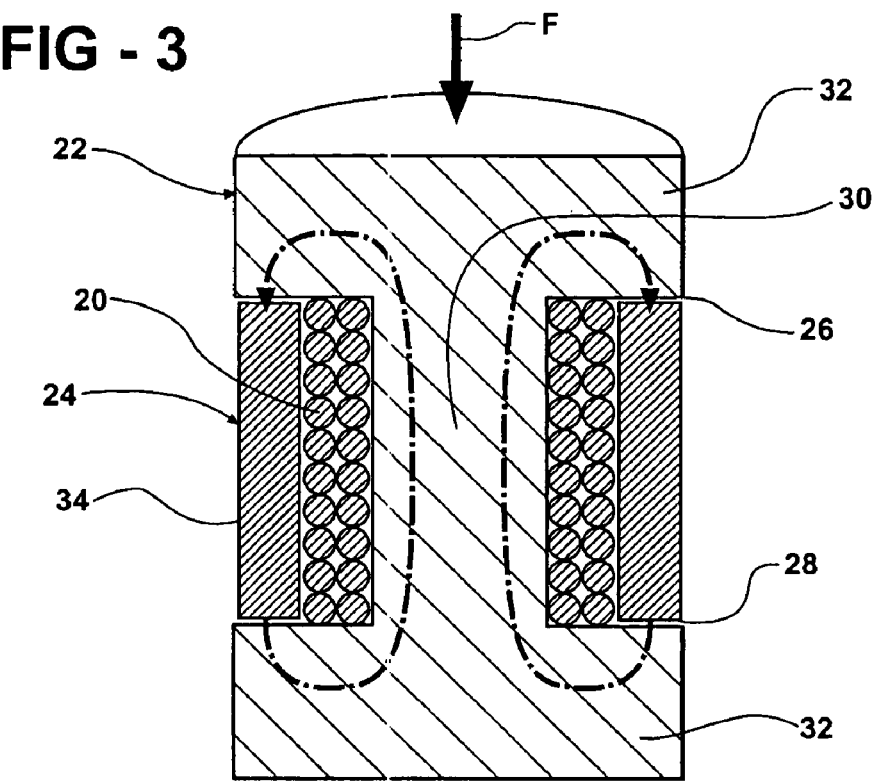
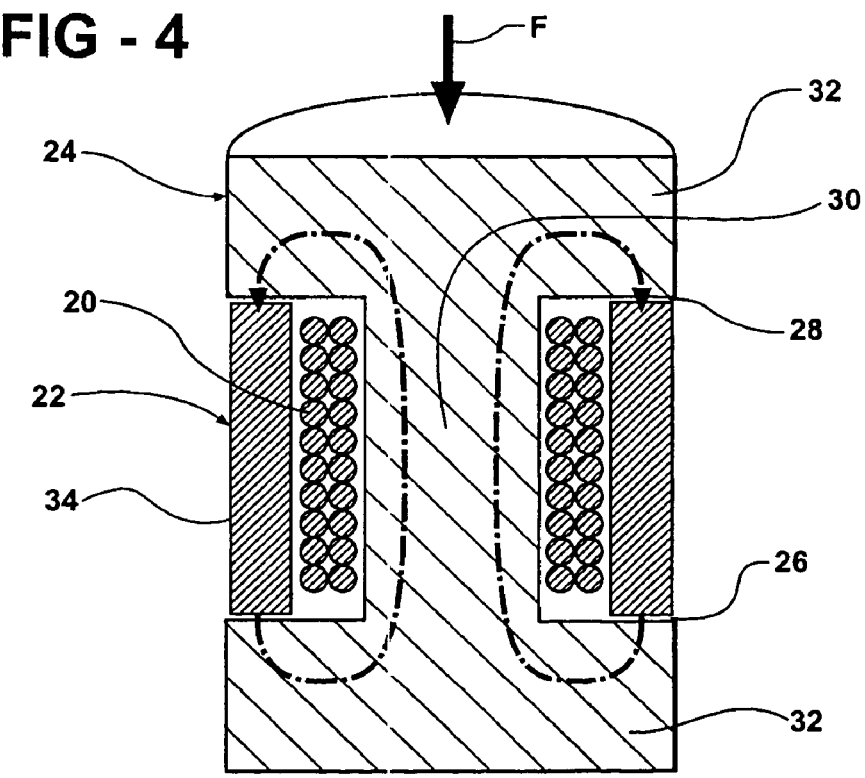

MAGNETOSTRICTIVE STRAIN SENSOR (AIRGAP CONTROL)

BACKGROUND OF THE INVENTION

1. Field of the Invention

The subject invention relates to a magnetostrictive strain sensor for measuring a strain along an axis.

2. Description of the Prior Art

Such magnetostrictive strain sensors are known and examples are disclosed and claimed in Ser. No. 10/423,317 filed Apr. 25, 2003 (DP-307303) and Ser. No. 10/313,660 filed Dec. 6, 2002 (DP-308459), both assigned to the assignee of the subject invention and both incorporated into this disclosure. An inductance coil extends around an axis for establishing a loop of magnetic flux looping axially through the coil and extending around the axis to define a donut shaped ring of magnetic flux surrounding the axis. A core made of a magnetostrictive material, such as a Nickel-Iron alloy, provides a primary path for the magnetic flux in a first portion of the loop of magnetic flux. A magnetic carrier provides a return path for the magnetic flux in a second portion of the loop of magnetic flux as the magnetic flux circles the coil through the core and the carrier. The permeability of the magnetostrictive core, thus the inductance of such a device, is a function of the strain applied to the core along the axis. The coil inductance therefore provides a useful signal.

The coil can be excited with an AC voltage or AC current to induce an alternating magnetic field in the core. This field loops around the coil, and will possibly travel through other elements and materials, such as airgaps, and other matter.

SUMMARY OF THE INVENTION AND ADVANTAGES

The invention provides for a first interface between the core and the carrier extending transversely to the axis whereby the core and the carrier are urged together at the interface in response to a force applied parallel to the axis.

Accordingly, the invention increases the sensitivity to the applied force. It does so by minimizing reluctances and rendering the coil inductance more sensitive to the permeability of the core.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a cross sectional view of a first embodiment of the subject invention;

FIG. 4 is a cross sectional view of a second embodiment of the subject invention;

DETAILED DESCRIPTION OF THE PREFERRED EMBODIMENT

Figure 1:
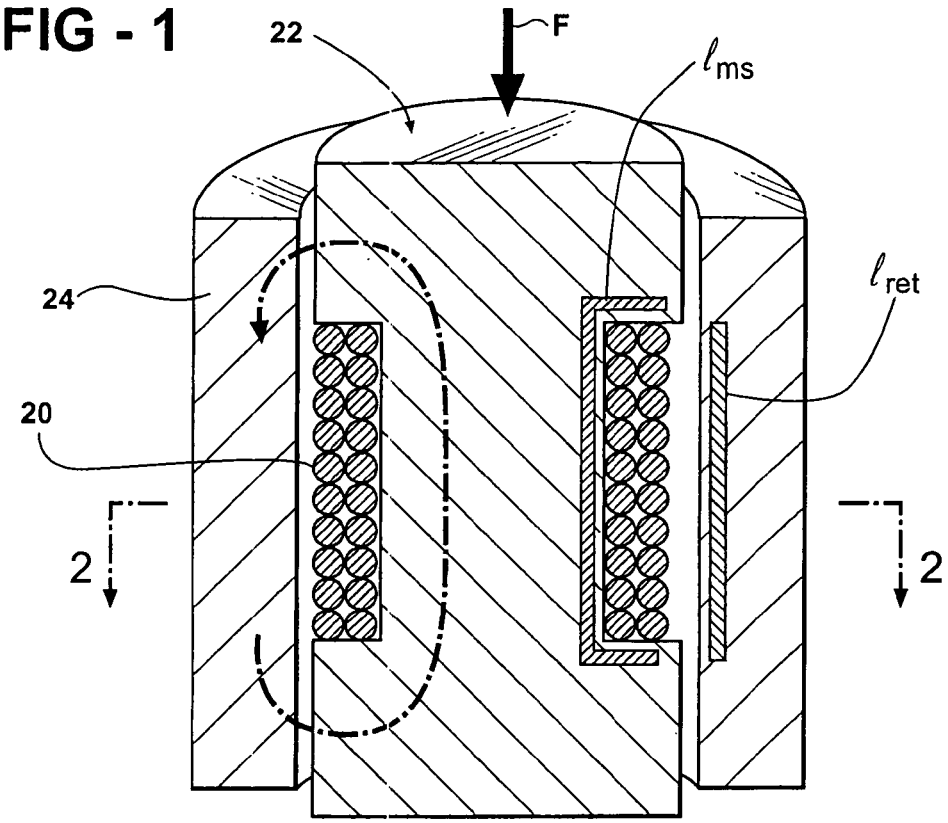
FIG. 1 is cross sectional view of a prior art magnetostrictive force sensor.
Figure 2:
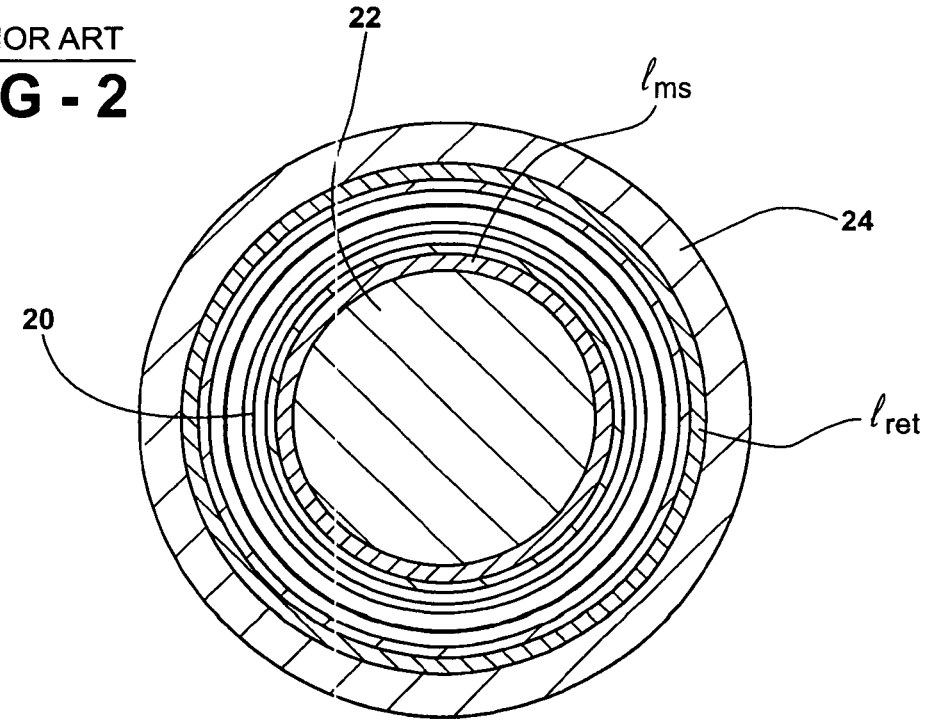
FIG. 2 is a cross sectional view taken along line 2—2 of FIG. 1.

In FIGS. 1 and 2, the coil 20 is shown wound around the magnetostrictive core 22. A carrier 24 is placed around the coil 20 and core 22, such as to provide a return path for the magnetic flux. Alternatively, the respective roles of the "core 22" and "carrier 24 for the return, path" may be reversed, and the magnetostrictive element subjected to the force being measured could be on the outside while the coil 20 is wound around a piece not subjected to the force. Generally speaking, therefore, "magnetostrictive core 22", or "core 22", here refers to the part that is magnetostrictive and subjected to the force to be sensed. The "return path" is the portion of the magnetic flux path that is not subjected to the force being sensed. The "return path" is thus made of a material or of several materials whose permeability(ies) do not need to be sensitive to the force being sensed.

Magnetostrictive strain sensors generally consist of a core 22, a coil 20, and of some material to provide a return path for the magnetic flux. The permeability of the magnetostrictive core 22, thus the inductance of such a device, is a function of the strain applied to the core 22. The coil 20 inductance therefore provides a useful signal. Sensing strain itself may be useful in some circumstances. The practioner however is usually more interested in the measure of the source of strain, such as force, torque, pressure, combination of these, etc., where the force, torque, or pressure, may be either compressing the magnetostrictive core 22 or applying tension to it. One skilled in the art can see how the core 22 can be placed so as to be subjected to one of these force, torque, pressure, etc, of interest to him, in such a way that this entity of interest will result in a change in strain level in the magnetostrictive core 22.

Example of useful magnetostrictive materials for the core 22 are: Nickel-Iron alloys, Cobalt-Iron alloys, or Terfenol, especially for sensors used in compression mode (usually the case for force sensors); Pure Nickel or Nickel alloy with a large percentage of Nickel, especially for sensors used in tension mode (which may include pressure sensors, as well as force sensors).

The coil 20 is excited with an AC voltage or AC current, and an alternating magnetic field is induced in the core 22, as shown with round arrows in FIG. 1. This field loops around the coil 20, and will possibly travel through other elements and materials, such as airgaps, and other materials called "carrier 24 for return path." The airgaps, and the nature and design of this "carrier 24 for return path", are the focus of this invention. By minimizing the reluctances, the coil 20 inductance becomes more sensitive to the permeability of the magnetostrictive core 22, thus to the applied force.

In FIG. 1, the coil 20 is shown wound around the magnetostrictive core 22, but the respective roles of the "core 22" and "carrier 24 for the return path" may be reversed, and the magnetostrictive element subjected to the force being measured could be on the outside while the coil 20 is wound around a piece not subjected to the force. Generally speaking, therefore, "magnetostrictive core 22", or "core 22", here refers to the part that is magnetostrictive and subjected to the force to be sensed. The "return path" is the portion of the magnetic flux path that is not subjected to the force being sensed. The "return path" is thus made of a material or of several materials whose permeabilities do not need to be sensitive to the force being sensed.

The inductance L of a coil 20 is inversely proportional to the reluctance R of the magnetic flux path, where N is the number of turns in the coil 20:

$$L = \frac{N^2}{R} \tag{1}$$

Neglecting leakage, the flux path generally comprises three segments in series: the magnetostrictive part (subscript ms), which is the part subjected to the force to be measured, and has a permeability $\mu_{ms}$ dependent on force being sensed; airgaps (lumped together, subscript gap); and other materials not subjected to the force being sensed, and thus with a constant permeability (subscript ret). Therefore:

$$R = R_{ms} + R_{gap} + R_{ret} \tag{2}$$

For the purpose of a qualitative analysis, each of these three segments can be assumed to have a constant cross-section S over its length l. Therefore:

$$R = \frac{l_{ms}}{\mu_{ms} S_{ms}} + \frac{l_{gap}}{\mu_o S_{gap}} + \frac{l_{ret}}{\mu_{ret} S_{ret}} \tag{3}$$

and the inductance is, combining Eqs. 1 and 3:

$$L = \frac{N^2}{\frac{l_{ms}}{\mu_{ms} S_{ms}} + \frac{l_{gap}}{\mu_o S_{gap}} + \frac{l_{ret}}{\mu_{ret} S_{ret}}} \tag{4}$$

In order to obtain the largest possible signal, it is clear from Eqs. 1–4 that the gap and return-path reluctances should be minimized so that the inductance can change as much as possible in response to a change in the magnetostrictive material permeability $\mu_{ms}$.

The reluctance of the airgaps, $$\frac{l_{gap}}{\mu_o S_{gap}},$$

must be minimized. Since $\mu_o = 1$ and $\mu_{ms}$ is usually several hundreds or several thousands (all permeabilities here are relative permeabilities), the length of the airgap must be as small as possible.

In the case where the materials for the magnetostrictive core 22 and for the carrier 24 for the return path are conducting, the reluctance terms are also a function of the skin depth. This is because, when a conducting material is subjected to a periodic magnetic field, eddy currents are generated inside the material that oppose the exciting field. As a result, the magnetic flux density decays exponentially from the surface inwards inside the material. This exponential penetration pattern is characterized by the so-called skin depth $\delta$, which, under ideal conditions, is given by:

$$\delta = \sqrt{\frac{\rho}{\pi f \mu}} \tag{5}$$

where $\rho$ is the material resistivity, and f the frequency of the exciting field.

Due to the non-uniform flux penetration, the reluctance calculation should include an integral over the penetration depth. For qualitative interpretation, however, it can be assumed for simplicity that the flux penetration is uniform, but limited to the skin depth. Assuming, as done in FIG. 1, that the core 22 and return path are cylinders of radii $r_{ms}$ and $r_{ret}$, respectively, and as long as the skin depth is small, the cross-sections of the flux path in these two elements are:

$$S_{ms} = 2\pi r_{ms} \delta_{ms} \tag{6}$$

$$S_{ret} = 2\pi r_{ret} \delta_{ret} \tag{7}$$

The core 22 and return-path carrier 24 reluctance terms are therefore, respectively:

$$R_{ms} = \frac{\sqrt{f}}{\sqrt{\rho_{ms} \mu_{ms}}} \frac{l_{ms}}{2\sqrt{\pi} \, r_{ms}} \tag{8}$$

$$R_{ret} = \frac{\sqrt{f}}{\sqrt{\rho_{ret} \mu_{ret}}} \frac{l_{ret}}{2\sqrt{\pi} \, r_{ret}} \tag{9}$$

At higher frequencies, the inductance is therefore:

$$L = \frac{N^2}{\frac{l_{gap}}{\mu_o S_{gap}} + \sqrt{f \left[ \frac{1}{\sqrt{\rho_{ms} \mu_{ms}}} \frac{l_{ms}}{2\sqrt{\pi} \, r_{ms}} + \frac{1}{\sqrt{\rho_{ret} \mu_{ret}}} \frac{l_{ret}}{2\sqrt{\pi} \, r_{ret}} \right]}} \tag{10}$$

The skin effect has the consequence of making the reluctances of the conducting materials larger, thus, to make these terms larger (more dominant) than the reluctance of the airgap or other constant terms.

Figure 9:
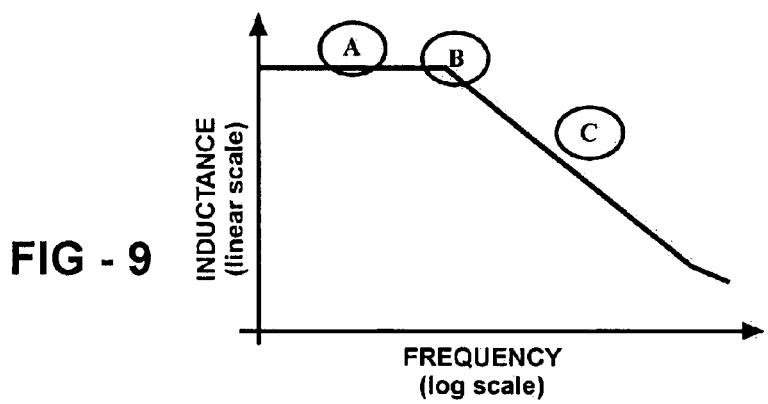

The inductance thus exhibits a pattern versus frequency shown in FIG. 9. At low frequency, where the skin depth is large (larger than the material thickness), the inductance is flat versus frequency (area A of Curve). At some frequency, a knee occurs (Area B) when the skin effects become noticeable. At that point and at higher frequencies, the reluctances of the conducting materials, including the reluctance of the magnetostrictive core 22, are more dominant.

It is therefore of practical interest to use a frequency such that the sensor is operating in area C of the curve, beyond the knee, when the reluctance of the conducting materials is dominant. Practically, for common materials, frequencies as low as 100 Hz are sufficient to operate in Area C. Preferred values of frequencies will however be either in the ranges 1 to 15 kHz or 15 to 50 kHz. Both of these ranges would provide adequate sensor dynamic response, allowing the force sensor to follow fast motion. For instance, the force pattern experienced during the motion of a vehicle brake system, if the sensor is part of such a system. The lower range (1 to 15 kHz) has the advantage of avoiding the range of frequencies usually chosen for motor control, thus minimizing interference if the sensor is close to a motor. The higher range (15 to 50 kHz) has the advantage of being inaudible for humans. It would also allow for yet higher dynamic response.

If both the magnetostrictive core 22 and the carrier 24 for the return path are conductive, however, there remains a need to ensure that the core 22, not the return path, is dominant in the inductance formula.

Looking at the respective reluctances of the core 22 and return paths, eqs. 8 and 9, it is thus desirable that:

$$R_{ms} = \frac{\sqrt{f}}{\sqrt{\rho_{ms}\mu_{ms}}} \frac{l_{ms}}{2\sqrt{\pi}\ r_{ms}} > R_{ret} = \frac{\sqrt{f}}{\sqrt{\rho_{ret}\mu_{ret}}} \frac{l_{ret}}{2\sqrt{\pi}\ r_{ret}} \qquad (11)$$

which, after some algebraic manipulations, is:

$$\mu_{ms}\rho_{ms}\left(\frac{r_{ms}}{l_{ms}}\right)^2 < \mu_{ret}\rho_{ret}\left(\frac{r_{ret}}{l_{ret}}\right)^2 \qquad (12)$$

Eq. 12 was developed in the case of a cylindrical geometry. It can be generalized as follows:

$$\mu_{ms}\rho_{ms} < \mu_{ret}\rho_{ret} \text{ (modified by geometrical terms)} \qquad (13)$$

The geometrical terms, lengths and radii in the case of a cylindrical geometry, can be stated in general terms as follows: The term "l" can be defined as "the length of the magnetic flux path in core, or "the length of the magnetic flux return path in carrier." These lengths are defined along the surface of the element that faces the coil 20, that is, where the skin effect restricts the magnetic flux. The radius term "r" can be defined as "the length of the eddy currents path in core, or "the length of the eddy currents path in carrier.

The practical implementation of the principle put forth in Eq. 13 will depend in particular on the particular material chosen for the magnetostrictive core 22. If the permeability of that material, $\mu_{ms}$, is low, for instance if Nickel, with a permeability of 200 or less, is used, then there is considerable latitude to choose a material for carrier 24 to satisfy Eq. 13: Many steels have permeabilities on the order of 1,000 or more (in annealed conditions). However, the permeability of the most suitable material for the magnetostrictive core 22, $\mu_{ms}$, for the application at hand, may be high. Nickel-iron alloys, for instance, are very desirable for force-sensor application, because they are relatively inexpensive, relatively strong, and exhibit a relatively high magnetostriction. The permeability of Nickel-Iron alloys may be on the order of 3,000. When choosing a material for the carrier 24, there are materials with higher permeabilities yet, however, they may be undesirable due to their usually higher cost. It may be necessary, then, to use a material with a permeability of similar magnitude (that is, $\mu_{ret} \sim \mu_{ms}$), including possibly the same material for carrier 24 as for the core 22 (then, $\mu_{ret} = \mu_{ms}$). In this situation, and in order to follow Eq. 13, one would need to either design the geometry to obtain desirable geometrical terms (for instance, a carrier 24 that is shorter in terms of magnetic flux path than the core 22), or ensure that the carrier 24 has a higher resistivity than the core 22. Higher resistivity can be obtain by special alloying, for instance the addition of silicon. Material in a powder form can be used. A higher resistivity can also be obtained by design. It is known, for instance, that cuts or slits in a piece of solid material lengthens the path of the eddy currents in that material, leading to an apparent resistivity that is larger, possibly several times larger, than the intrinsic resistivity of the material. In the latter case, for instance, carrier would be "C shaped" rather than a full cylinder.

A sensor assembly for measuring force along an axis in accordance with the subject invention is shown in various embodiments in FIGS. 3–7 wherein like parts or portions are indicated with like numerals.

At least one inductance coil 20 having multiple turns or coils 20, or multiple coils 20 each having one or more turns or coils 20, extends around the force axis for establishing a loop of magnetic flux (shown by the arrows) looping axially through the coil 20 and extending around the axis to define a donut shaped ring of magnetic flux surrounding the axis. In the exemplary embodiments shown here, only one coil 20 is shown, and the self-inductance of the coil 20 is calculated and measured. Alternative embodiments may include several coils 20, either connected in series or separately, and "inductance" should be understood as, more generally, self-inductance or mutual inductance.

In the exemplary figures shown in this application, the force axis happens to coincide with a geometrical axis of symmetry. However, the word "force axis" should be understood broadly as the direction of the force, or the direction of the force path, through the core 22. In fact, the force axis or force path may, or may not be an axis of symmetry; it may, or may not be, a line, and one could envision situations where this path or axis is not straight but curved. It could also be a surface rather than a line.

A core 22 of magnetostrictive material provides a primary path for the magnetic flux in a first portion of the loop of magnetic flux.

A magnetic carrier 24 provides a return path for the magnetic flux in a second portion of the loop of magnetic flux as the magnetic flux circles the coil 20 through the core 22 and the carrier 24.

The subject invention establishes a first interface 26 between the core 22 and the carrier 24 extending transversely to the axis whereby the core 22 and the carrier 24 are urged together at the interface 26 in response to a force applied parallel to the axis. A second interface 28 is disposed between the core 22 and the carrier 24 extending transversely to the axis whereby the core 22 and the carrier 24 are urged together at both of the interfaces 26, 28 in response to a force applied parallel to the axis. As indicated the interfaces 26,28 are perpendicular to the central or force axis. The first interface 26 extends radially from the axis and circumferentially about the axis and the second interface 28 extends radially from the axis and circumferentially about the axis. By being urged together in response to the applied force, the interfaces 26, 28 will be guaranteed to constitute airgaps of zero length, or at least of a length as short as possible. The core 22 and carrier 24 are urged together at interfaces 26, 28 because these interfaces 26, 28 are normal to axis and thus are normal to the force path.

Figure 5:
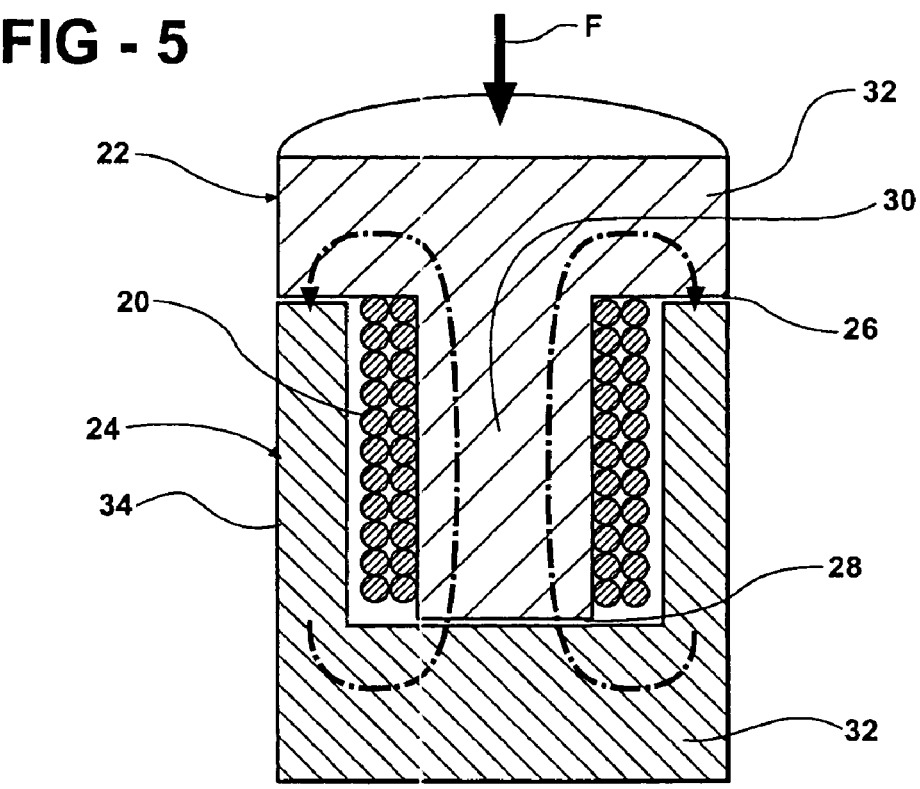
FIG. 5 is a cross sectional view of a third embodiment of the subject invention.
Figure 6:
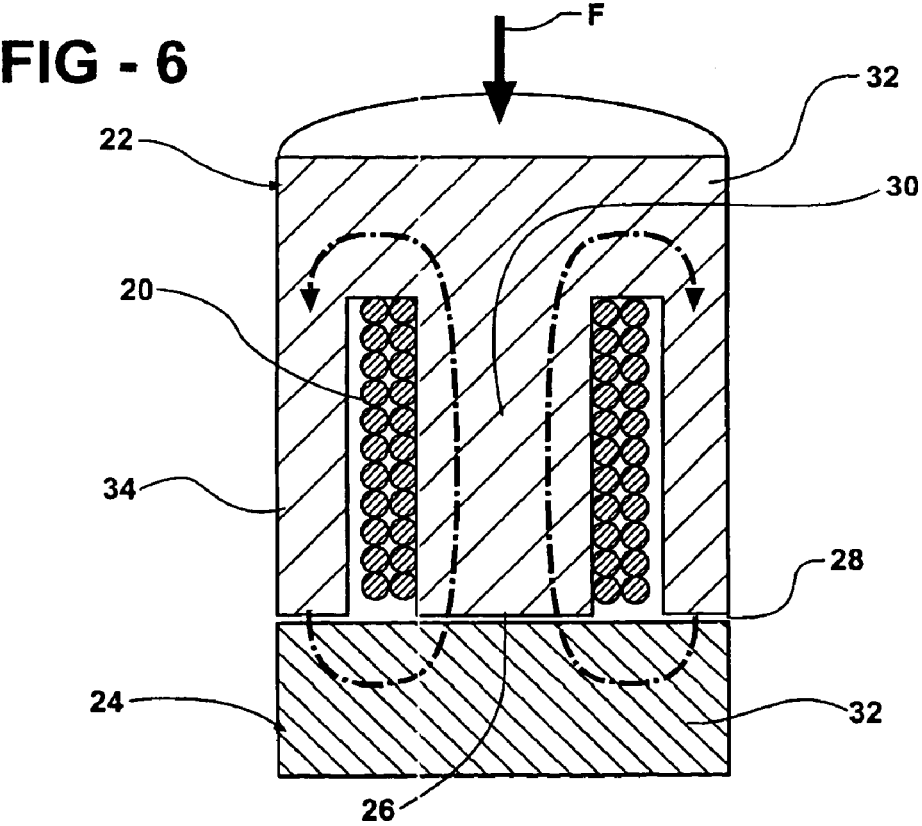
FIG. 6 is a cross sectional view of a fourth embodiment of the subject invention.
Figure 7:
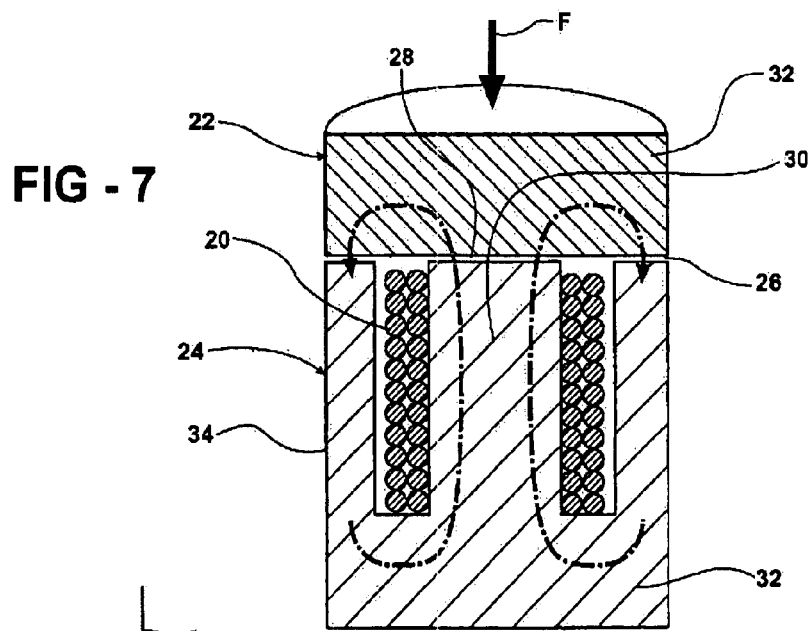
FIG. 7 is a cross sectional view of a fifth embodiment of the subject invention.

The coil 20 defines axial ends and the first interface 26 is disposed at one of the ends and second interface 28 is disposed at one of the ends. In the embodiments of FIGS. 3–5, the first interface 26 and the second interface 28 are disposed at opposite of the ends of the coil 20. In the embodiments of FIGS. 6 and 7, the first interface 26 and the second interface 28 are disposed at the same end of the coil 20.

Either one of the core 22 and the carrier 24 defines a stem 30 in the form of a central solid shaft or cylinder extending axially between ends. In further generic terms, one of the core 22 and the carrier 24 defines a flange 32 extending radially from each of the ends. Continuing in generic terms, one of the core 22 and the carrier 24 defines a sleeve 34 extending axially between the flanges 32, the coil 20 being disposed about the stem 30.

More specifically and as shown in FIGS. 3 and 4, one of the core 22 and the carrier 24 includes the stem 30 and the flanges 32 and the other of the core 22 and the carrier 24 defines the sleeve 34 extending axially between the interfaces 26, 28 at the flanges 32 and around the coil 20 and the axis F. Yet more specifically, the carrier 24 in FIG. 3 defines the sleeve 34 whereas the core 22 defines the sleeve 34 in FIG. 4.

In FIGS. 5–7, one of the core 22 and the carrier 24 includes the stem 30 and a first of the flanges 32 and the other of the core 22 and the carrier 24 includes the second of the flanges 32, with at least one of the interfaces 26, 28 being disposed between the stem 30 and the second of the flanges 32. In FIG. 5 and its reversal of core 22 and carrier 24, one of the core 22 and the carrier 24 includes the stem 30 and the other of the core 22 and the carrier 24 includes the sleeve 34 with the first interface 26 between the first of the flanges 32 and the sleeve 34 and the second of the interfaces 26, 28 between the stem 30 and the second of the flanges 32. As shown in FIG. 5, the core 22 defines the stem 30 and the carrier 24 defines the sleeve 34, however, it may be reversed with the core 22 defining the sleeve 34 and the carrier 24 defining the stem 30 (not shown). While in FIGS. 6 and 7, one of the core 22 and the carrier 24 includes the stem 30 and the sleeve 34 while the other of the core 22 and the carrier 24 includes the second of the flanges 32 with the first interface 26 and the second interface 28 disposed in the same plane between the second flange 32 and each of the stem 30 and the sleeve 34. The core 22 defines the stem 30 and the sleeve 34 in FIG. 6 whereas the carrier 24 may define the stem 30 and the sleeve 34.

Figure 8:
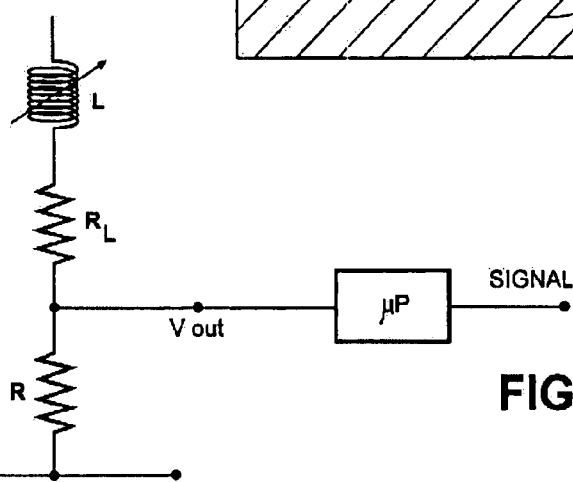
FIG. 8 is a schematic of a circuit to excite and detect the subject invention.

An excitation source or circuit is illustrated in FIG. 8 for exciting the coil 20 for establishing the loop of magnetic flux, with a detection circuit responsive to the inductance resulting from the magnetic flux.

Example of useful magnetostrictive materials for the core 22 are: Nickel-Iron alloys, Cobalt-Iron alloys, or Terfenol, especially for sensors used in compression mode (usually the case for force sensors); Pure Nickel or Nickel alloy with a large percentage of Nickel, especially for sensors used in tension mode (which may include pressure sensors, as well as force sensors).

The interfaces 26, 28, and the nature and design of this "carrier 24 for return path", are the focus of this invention. By minimizing reluctances, the coil 20 inductance becomes more sensitive to the permeability of the magnetostrictive core 22, thus to the applied force.

Obviously, many modifications and variations of the present invention are possible in light of the above teachings. The invention may be practiced otherwise than as specifically described within the scope of the appended claims. In addition, the reference numerals in the claims are merely for convenience and are not to be read in any way as limiting.

What is claimed is:

1. A sensor assembly for measuring strain along an axis (F) comprising;
    at least one inductance coil for establishing a loop of magnetic flux,
    a core of magnetostrictive material for providing a primary path for the magnetic flux in a first portion of the loop of magnetic flux, and
    a magnetic carrier for providing a return path for magnetic flux in a second portion of the loop of magnetic flux as the magnetic flux circles said coil through said core and said carrier, and
    characterized by a first interface between said core and said carrier extending transversely to said axis (F) whereby said core and said carrier are urged together at said interface in response to said strain applied parallel to said axis (F);
    wherein one of said core and said carrier defines a stem extending axially between ends and a flange extending radially from one of said ends, said coil being disposed about said stem, said first interface being disposed between the flange and the other of said core and said carrier.

2. An assembly as set forth in claim 1 including a second interface between said core and said carrier extending transversely to said axis (F) whereby said core and said carrier are urged together at both of said interfaces in response to a force applied parallel to said axis (F).

3. An assembly as set forth in claim 2 wherein said coil extends around said axis (F) for establishing said loop of magnetic flux looping axially through said coil and extending around said axis (F) to define a donut shaped ring of magnetic flux surrounding said axis (F), and said first interface extends radially from said axis (F) and circumferentially about said axis (F) and said second interface extends radially from said axis (F) and circumferentially about said axis (F).

4. An assembly as set forth in claim 3 wherein said second interface is disposed at the other of said ends.

5. An assembly as set forth in claim 1 wherein the flange is a first flange extending from a first end, and wherein the stem further comprises a second flange extending radially from a second end, and wherein the other is a sleeve extending axially between said flanges, said coil being disposed about said stem between the first and second flanges.

6. An assembly as set forth in claim 5 wherein said core includes said stem and said flanges, and said carrier defines said sleeve extending axially between said interfaces at said flanges and around said coil and said axis (F).

7. An assembly as set forth in claim 1 wherein the one of said core and said carrier comprises a sleeve.

8. An assembly as set forth in claim 1 wherein the flange is a first flange and said one of said core and said carrier includes a sleeve extending from the first flange, and the other of said core and said carrier includes a second flange, and wherein the first interface is disposed between the sleeve and the second flange.

9. An assembly as set forth in claim 1 wherein the flange is a first flange and the other of said core and said carrier includes a second flange and a sleeve extending from the second flange, with said first interface disposed between said first flange and said sleeve and a second interface disposed between said stem and said other of said core and said carrier.

10. An assembly as set forth in claim 9 wherein said core defines said stem and said carrier defines said sleeve.

11. An assembly as set forth in claim 1 wherein the flange is a first flange and said one of said core and said carrier includes a sleeve while the other of said core and said carrier includes a second flange with said first interface disposed between the first flange and the said sleeve and a second interface disposed in the same plane between said second flange and said stem.

12. An assembly as set forth in claim 11 wherein said core defines said stem and said sleeve.

13. An assembly as set forth in claim 5 wherein said core comprises a Nickel-Iron alloy.

14. An assembly as set forth in claim 5 including an excitation source for exciting the coil for establishing said loop of magnetic flux, and a detection circuit responsive to the inductance resulting from said magnetic flux.

15. A sensor assembly for measuring strain comprising;
at least one inductance coil for establishing a ioop of magnetic flux,
a core of magnetostrictive material for providing a primary path for the magnetic flux in a first portion of the loop of magnetic flux, said core comprising a stem extending axially between ends and a flange extending radially from one of said ends, and
a magnetic carrier for providing a return path for magnetic flux in a second portion of the loop of magnetic flux as the magnetic flux circles said coil through said core and said carrier, and
characterized in that said magnetic carrier is disposed adjacent the flange of the core so as to form a first interface between said core and said carrier extending transversely to the axis, whereby said core and said carrier are urged together at said interface in response to said strain wherein:

$$R_{ms} = \frac{\sqrt{f}}{\sqrt{\rho_{ms}\mu_{ms}}} \frac{l_{ms}}{2\sqrt{\pi}\, r_{ms}} > R_{ret} = \frac{\sqrt{f}}{\sqrt{\rho_{ret}\mu_{ret}}} \frac{l_{ret}}{2\sqrt{\pi}\, r_{ret}} \quad (11)$$

which, after algebraic manipulations, is:

$$\mu_{ms}\rho_{ms}\left(\frac{r_{ms}}{l_{ms}}\right) < \mu_{ret}\rho_{ret}\left(\frac{r_{ret}}{l_{ret}}\right)^2 \quad (12)$$

and generalized as:

$$\mu_{ms}\rho_{ms} < \mu_{ret}\rho_{ret} \quad (13)$$

the term "$l_{ms}$" being defined as "the length of the magnetic flux path in said core," "$l_{ret}$" the length of the magnetic flux path in said carrier," "$r_{ms}$" being defined as "the length of the eddy current path in said core," "$r_{ret}$" as "the length of the eddy current path in said carrier," where $\rho$ is the material resistivity, $\mu$ is permeability, ms denotes said core, and ret denotes said carrier.

* * * * *